(12) United States Patent
Levene

(10) Patent No.: US 8,193,937 B2
(45) Date of Patent: Jun. 5, 2012

(54) SYSTEMS OR METHOD FOR TRACKING DIE USE OR YIELD

(75) Inventor: Gary S. Levene, Kitchener (CA)

(73) Assignee: Ontario Die International Inc., Kitchener, Ontario ( * ) Notice: Subject to any disclaimer, the term of this patent is extended or adjusted under 35 U.S.C. 154(b) by 260 days.

(21) Appl. No.: 12/439,048

(22) PCT Filed: Aug. 28, 2007

(86) PCT No.: PCT/CA2007/001474
§ 371 (c)(1),
(2), (4) Date: Feb. 26, 2009

(87) PCT Pub. No.: WO2008/025129
PCT Pub. Date: Mar. 6, 2008

(65) Prior Publication Data
US 2009/0322534 A1 Dec. 31, 2009

Related U.S. Application Data

(60) Provisional application No. 60/840,718, filed on Aug. 26, 2006, provisional application No. 60/846,330, filed on Sep. 22, 2006.

(51) Int. Cl.
*G08B 13/14* (2006.01)
(52) U.S. Cl. .............. 340/572.1; 340/568.1; 340/539.1
(58) Field of Classification Search .... 340/572.1–572.9, 340/568.1, 539.1, 586.1
See application file for complete search history.

(56) References Cited

U.S. PATENT DOCUMENTS

| | | | |
|---|---|---|---|
| 5,689,986 A * | 11/1997 | Jacobs, Jr. | 72/7.4 |
| 5,757,950 A | 5/1998 | Bruder | |
| 5,884,425 A * | 3/1999 | Baldwin | 40/638 |
| 6,298,275 B1 | 10/2001 | Herman | |
| 6,487,473 B1 | 11/2002 | Beck et al. | |
| 6,591,227 B2 | 7/2003 | Koehler | |
| 6,768,419 B2 | 7/2004 | Garber et al. | |
| 7,665,669 B2 * | 2/2010 | Steidinger et al. | 235/492 |
| 7,857,127 B2 * | 12/2010 | Lau | 206/223 |
| 2006/0187060 A1 | 8/2006 | Colby | |
| 2007/0039436 A1* | 2/2007 | May et al. | 83/13 |
| 2008/0224598 A1* | 9/2008 | Baretz et al. | 313/503 |

FOREIGN PATENT DOCUMENTS
DE 29805551 7/1998
(Continued)

OTHER PUBLICATIONS

WIPO,Written Opinion of the International Searching Authority for PCT/CA2007/001474, mailed Jan. 14, 2008, 5 pages.

(Continued)

*Primary Examiner* — Daniel Previl
(74) *Attorney, Agent, or Firm* — Bereskin & Parr LLP

(57) ABSTRACT

According to one aspect, a system that includes an RFID (Radio Frequency Identification) tag reader, a plurality of cutting dies, a plurality of RFID tags connectable to the corresponding cutting dies, and a controller including a computer usable program code including program instructions for scanning instruction the RFID tag reader to scan the RFID tags, updating respective piece counts corresponding to specific shapes provided by some of the plurality of cutting dies, and displaying the respective piece counts.

14 Claims, 3 Drawing Sheets

FOREIGN PATENT DOCUMENTS

| | | |
|---|---|---|
| DE | 19941862 | 5/2000 |
| DE | 19944581 | 12/2000 |
| WO | 2007048248 | 5/2007 |
| WO | 2008025129 | 3/2008 |

OTHER PUBLICATIONS

European Patent Office, Extended Search Report, Oct. 11, 2011, 6 pages, Euope.
Chinese Patent Office, First Office Action, Jun. 12, 2010, 7 pages, China.
Chinese Patent Office, Second Office Action, Dec. 27, 2010, 7 pages, China.
International Bread of WIPO, International Search Report and Written Opinion, Jun. 17, 2009, 11 pages, Switzerland.
Instituto Mexicano de la Propiedad Industrial, First Office Action, Oct. 13, 2011, 4 pages, Mexico.
DE19944581—English Translation of Abstract and Description.
DE29805551—English Translation of Description.
English Explanation of Mexican First Office Action from Oct. 13, 2011.

* cited by examiner

SYSTEMS OR METHOD FOR TRACKING DIE USE OR YIELD

FIELD

This specification relates to the field of die cutting, for example cutting leather with cavity dies.

BACKGROUND

The following paragraph is not an admission that anything discussed therein is citable as prior art or part of the general knowledge of people skilled in the art.

Leather products, such as parts for an automobile interior, may be made from pieces of leather cut to patterns. To cut the pieces of leather, dies may be made in the shapes of the patterns, placed on leather hides and pushed through the leather in a press. Several die shapes may be needed to cut all of the distinct pieces that will be sewn together to create an end product. An order for a given number of end products, for example a given number of interiors of a given make and model of automobile, will require a certain number of pieces cut according to each pattern. Because of the high expense of leather and the irregular shape and uniqueness of each hide, dies may be placed on the hides by hand in order to maximize the usage of acceptable leather. A complete set of dies making up one final product is unlikely to efficiently fit on one hide. Instead, a variety of dies will be fitted to the hide by a worker in an attempt to generate a good yield from each hide. A good yield is achieved when the amount of scrap, that is the unused material between dies, is minimized. Another worker may keep track of the quantity of pieces cut using each pattern so as to end up with the correct number of pieces cut to each pattern to fill an order.

SUMMARY

The following summary is intended to introduce the reader to this disclosure and not to define any invention or limit any claim. An invention may reside in any combination of any one or more process steps or apparatus elements selected from the set of all apparatus elements or process steps described in this disclosure.

A company cutting leather pieces for assembly into a desired number of products, such as automobile interior components, may wish to track the number of pieces cut to each or several patterns that are required to create the products. The company may also, or alternately, wish to determine the yield of cut products as a percentage of the area of a particular hide.

This disclosure describes a system or method in which an RFID (Radio Frequency Identification) tag containing information related to a pattern identity associated with each die may be placed onto each die. The RFID tags on dies placed on a hide for cutting may be polled to update a count of each pattern cut or to be cut. Optionally, the count may be used to determine when enough pieces have been cut for an order or to provide an alert when a pieces is about to be cut that is not required for the order. Further optionally, the count may be compared to a desired number of pieces cut with a die to inform an operator of the number of pieces still to be cut with the die.

This disclosure also describes a system or method in which a hide may be scanned and fitted with an RFID tag containing information related to the area of the hide. Dies may be placed on the hide and the RFID tags on the hide and on the dies polled. The RFID tags on the dies may contain information related to the area of a piece cut by that die. The total area of dies on the hide may be compared to the area of the hide to determine a yield from the hide. The yield from the hide may be compared to a desired or minimum yield, for example to provide an alert when the desired or minimum yield is not met.

DETAILED DESCRIPTION OF AN EXAMPLE OF A SYSTEM OR PROCESS

The following description will provide an example of an embodiment of each claim. However, one or more inventions may be disclosed in the following description without being claimed in this document and the claims in this document may not read on every apparatus or process or every part of any apparatus or process described below. The inventors and their assigns do not disclaim any such invention or dedicate it to the public merely by not claiming it in this document.

Figure 1:
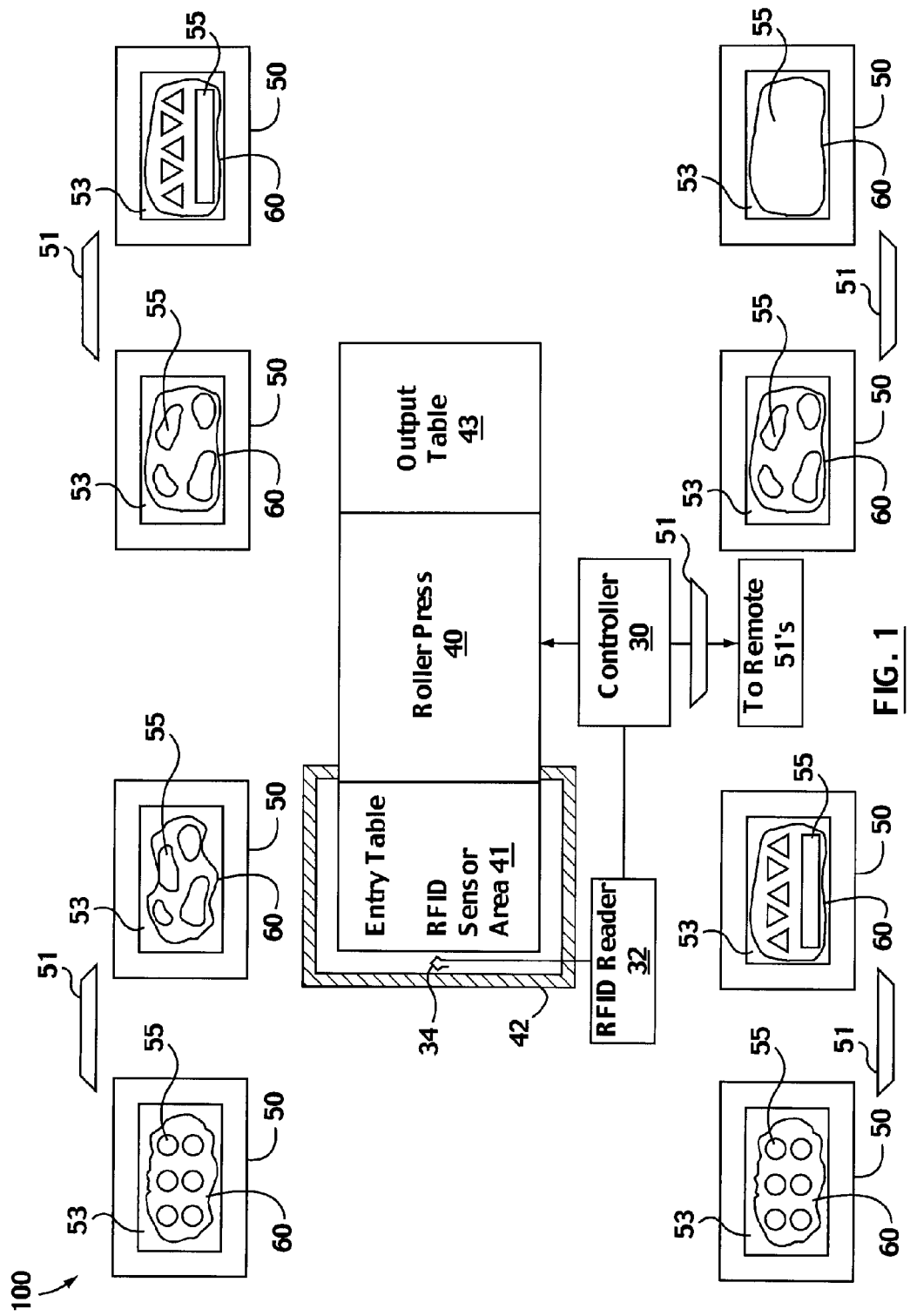
FIG. 1 is a schematic view of a system for cutting pieces of leather with cavity dies.

FIG. 1 shows a schematic view of a system 100. The system 100 includes a controller 30, a press 40, a number of displays 51 and a number of working tables 60. The press 40 may be a roller press, a beam press or any other cutting press or apparatus which applies downward pressure causing a die to cut through a material, for example a leather hide. The system 100 also includes a suitable combination of associated structural elements, communications systems, mechanical systems, hardware, firmware and software that is employed to support the function and operation of the system 100. Only selected items relating to the system 100 will be described below.

The controller 30 may be a general purpose computer or the like programmed and configured to receive and display or transmit data and perform operations as will be described further below. The press 40 is provided to apply pressure to cutting dies 55 arranged on leather hides 60 as they pass through or under the press 40. The press 40 thus causes the cutting dies 55 to cut the leather in the shapes of patterns associated with the dies 55. The press 40 shown is a roller press arranged so that there is an output table 43 on one end and an entry table 41 on the other. Alternately, material to be cut may return to the entry table 41 and the output table 43 may be omitted. The entry table 41 also serves as the base of an RFID reading area and may be provided with an RF shield 42 to prevent interference from tags not within the RFID reading area on the entry table 41. An antenna 34 is located so as to be able to read, or poll, RFID tags within the RFID reading area and connected to an RFID reader 32 which is in turn connected to the controller 30. Optionally, the antenna 34 and RFID reader 32 may be integrated into a single unit.

In operation, workers at the working tables 50, alternately called nesting cells, arrange cutting dies 55, with their cutting edges facing downward, on top of hides 60 that are spread across cutting boards 53 arranged on each working table 50. Once the cutting dies 55 are arranged, a cutting board 53 supporting a particular hide 60 and its respective dies 55 is moved within the RF shield 42 and onto the entry table 41. Each die 55 has an RFID tag (shown as element 72 in FIG. 3) mounted on it that has been previously written with data, such as an alphanumeric series, related to the identification of the pattern cut by the die 55. The RFID tag 72 may also have been written with other information such as the area of the piece cut by the die 55, the manufacturer of the die 55, the end product that the die 55 is for, etc. The RFID tag may be passive or active. An active tag may be better if the tag will be read on an entry table 41 adjacent the press 40. An active tag may produce a stronger signal which may allow the antenna 34 to be located further from the press 40 and also tolerate greater electrical interference than a passive tag.

On the entry table 41 the antenna 34 and reader 32 scan the entry table 41 to detect the presence of, and read, the tags on the dies 55 within the RF shield 42. The identity of each die 55, and optionally other information, is sent by a communications system (not specifically shown) to the controller 30. In general, if the cutting board 53 is sent to the press 40, counts of the number of pieces cut with each die 55 will be updated. Counts of the pieces cut using the various dies 55 can be stored by the controller 30 and displayed on the controller 30, on displays 51, output in other forms or further manipulated, optionally in combination with other data such as time, worker name etc. The counts, if sent to displays 51, can provide workers with updates of the pieces, or the dies 55 related to the pieces, that still need to be cut and/or no longer need to be cut. The controller 30 may optionally send various alerts, such as an alert that an order has been filled or an alert advising that a cutting board 53 has been placed on the entry table 41 containing a die 55 for a piece no longer required.

Figure 2:
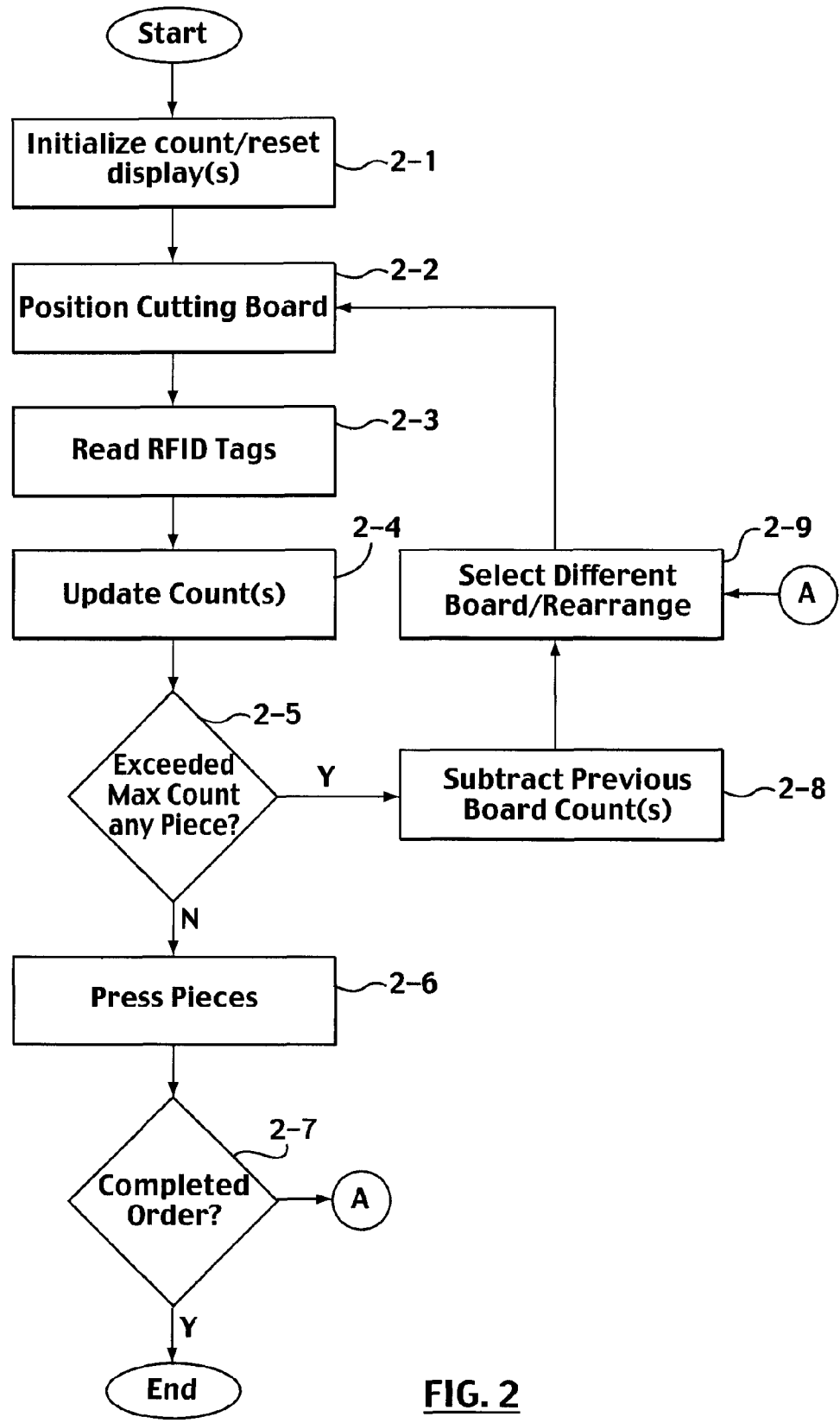
FIG. 2 is a flow-chart illustrating a method of tracking or managing leather pieces cut using the system of FIG. 1.

FIG. 2 shows a flow-chart of a method of tracking or managing the cutting of leather pieces using cutting dies 55. Step 2-1 includes obtaining the identity and number of each pattern required for an order, initializing the count(s) for each pattern, resetting the displays 51. Step 2-2 includes positioning a cutting board 53 within the range of a reader, for example on the entry table 41, and preferably to the general exclusion of interference, such as would be provided by the RF shield 42. Step 2-3 includes scanning (or reading) the tags on the dies 55 on the entry table 41 and sending information related to the identity of the patterns cut by the dies 55 to the controller 30. Step 2-4 includes updating the count(s) for each pattern by the number of dies 55 related to that pattern on the cutting board 53.

Optionally, the cutting boards 53 may be scanned at one or more remote scanning tables, which could be the working tables 50. This may be done if the area around the press 40 contains sufficient metal and electrical activity or interference to interfere with reading the RFID tags. In that case, the entry table 41 may be an ordinary infeed table for the press 40. A remote scanning table can be set up in an area of less interference, or where enhanced shielding can be provided, and the process operated as shown in FIG. 2 but with an additional step of moving the cutting board 53 from the remote scanning table to the entry table 41. Further alternately, one or more remote scanning tables can be provided, each with an antenna 34 and reader 32, appropriate shielding if necessary, and a communications link to controller 30. In this way, multiple cutting boards 53 can have the counts of their dies 55 made and checked against a maximum, as will be described below, during overlapping time intervals.

Before the cutting board 53 is put in the press 40, however, step 2-5 includes determining if a respective maximum count for a particular pattern has been exceeded. If a maximum count has not been exceeded ("no" path, step 2-5), then the cutting board 53 on the entry table 41 can be sent to the press 40 for cutting. Accordingly, step 2-6 includes pressing the dies 55 on the cutting board 53 through the hide 60 in the press 40 and so cutting the leather into the shape of the die. Optionally, activation of the press 40 can cause a message to be sent to controller 30 to update a count of the number of hides 60 that have been cut.

On the other hand, if the required count of any pattern is exceeded ("yes" path, step 2-5), then the controller 30 displays an alert and the hide 60 on the entry table 41, or other scanning area or table, is not cut. Accordingly, step 2-8 includes subtracting from the updated count(s) tabulated at step 2-4 for each dies 55 on the entry table 41. Following step 2-8, step 2-9 includes selecting a different cutting board 53 to be cut and/or rearranging or replacing the cutting dies 55 on the existing cutting board 53 for example by removing one or more dies 55 that are not required and, if possible, replacing them with one or more dies 55 that are still required before looping back to step 2-2.

After step 2-6, step 2-7 includes determining whether or not an order is complete, meaning that all the pieces that were required for the order have been cut. If the order is not complete ("no" path, step 2-7), the method proceeds through to step 2-9 as described above except that another cutting board 53, hide 60 and set of dies 55 is brought to the entry table 41. On the other hand, if the order is complete ("yes" path, step 2-7), the method can end and controller 30 may send an alert that the order has been filled.

Step 2-7 may further include determining a number of pieces yet to be cut according to each pattern by subtracting the number cut to each pattern from the number required for each pattern. This may be done separately or as part of the process of determining whether an order is complete. The number of pieces yet to be cut for one or more patterns, and a corresponding die or pattern identifier, may be displayed on one or more of the displays 51 or otherwise communicated to people working with the dies 55 or others, such as their supervisor. In this way, people working with the dies will have information letting them know which dies 55 they should attempt to use in rearranging a cutting board 53 or preparing a new cutting board 53.

Figure 3:
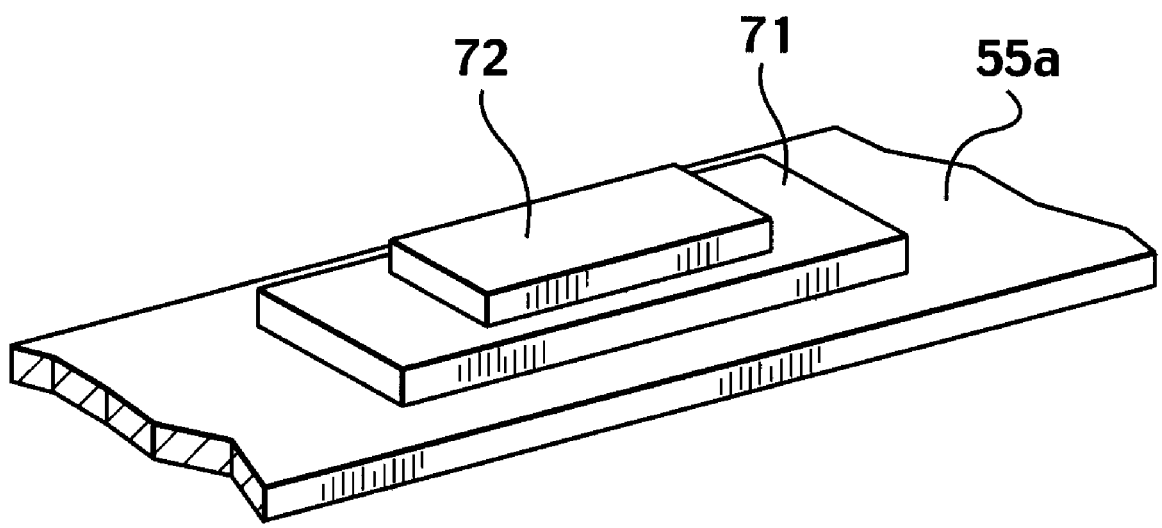
FIG. 3 is a perspective view of a portion of a die from FIG. 1 fitted with an RFID tag.

FIG. 3 is an exploded perspective view of a portion of a metal cutting die 55a fitted with an RFID tag 72. In order to reduce the possibility that skin effects from the metal cutting die 55a may interfere with the operation of the RFID tag 72, a separator 71 made from an insulating material is provided between the RFID tag 72 and the die 55a.

In an additional, or alternate, process the hides 60 are scanned to determine their area. A hide RFID tag is written containing this area, and optionally other information such as a hide identifier or information related to the colour or source of the hide 60. The hide RFID tag is attached to the hide. RFID tags 72 attached to dies 55 are may also be written with information corresponding to the area of the piece cut by the die 55. This area information may be provided from a drawing file for the pattern. When a cutting board 53 is placed on the entry table 41 and the RFID tags are read, the identity or area of the hide 60 and area or identity of the dies 55 is collected and sent to the controller 30. If only the identity of the hide 60 or dies 55 is contained on the RFID tags, the controller may access a data file linking the hide 60 identifier or die 55 identifier with a corresponding area. The collected information is used to calculate a yield value by determining the area of hide 60 converted into cut pieces compared to the total area of hide 60. This information may be used for any one or more of a variety of purposes, for example to provide an indication that a minimum yield has been met or an alert when a minimum yield is not met. For example, whether scanning is done at the entry table 41 or at one or more remote scanning tables, an indicator may be provided if the yield is above a minimum yield thus indicating to a person who prepared a cutting board 53 that they may send that cutting board 53 to the press 40. Conversely, an alert may be provided indicating that a minimum yield has not been met which may be used to inform the person that they should attempt to reconfigure the cutting board 53, prevent operation of a press 40 unless the alert is overridden by a supervisor, inform a supervisor of a below yield cutting board 53, or a plurality of these uses. For further example, particularly where a working table 50 is a remote scanning area, the yield value may be shown on the display 51 near that working table 50. The yield value may be updated by way of the person placing dies 55 instructing the reader 32 to make a reading or the yield value may be updated automatically by the controller 30 instructing the reader 32 to take readings at repeated time intervals. By either method, a revised yield number may be presented on the display 51 after a die 55 is placed on, or removed from, the cutting board 53. In this way, the operator may gain information as to the effect of any particular removal or addition of a die 55 and so gain knowledge that will help him or her to reach a higher yield, or reach a desired yield more quickly, as well as indicating when a target yield is met. The information may also be used for other purposes, for example to provide statistics comparing yields to an employee, a plant, a source of hides, time etc.

While the above description provides one or more examples of an apparatus or process, another apparatus or process not described above may fall within the fair meaning and scope of the accompanying claims.

I claim:

1. A method comprising the steps of:
providing at least one cutting die with an RFID (Radio Frequency Identification) tag containing information related to the identity of the die on a hide; scanning the RFID tag;
updating a count associated with the die; and
determining and displaying the difference between the maximum count and the count associated with a die.

2. A method according to claim 1 further comprising: determining whether or not the count exceeds a predefined maximum count; and, cutting the hide with the die if the maximum count has not been exceeded.

3. A method according to claim 2 further comprising: providing a plurality of cutting dies, at least one of the cutting dies having a shape that is different from another cutting die, the cutting dies having RFID tags; scanning the RFID tags of each of the plurality of dies; and updating a count associated with each of the plurality of dies.

4. A method according to claim 2 further comprising determining whether an order requiring a quantity of pieces to be cut by the die is complete.

5. A method according to claim 2 further comprising storing a count related to a quantity of pieces cut by a die.

6. A method according to claim 2 further comprising: re-selecting a die so as to cut a required piece to fill an order; and scanning the re-selected die.

7. A method according to claim 2 further comprising shielding an area from Radio Frequency (RF) interference within which an RFID tag on a die can be scanned.

8. A method according to claim 1 further comprising: providing an RFID tag containing information related to the area of the hide; scanning the RFID tag to determine the hide area.

9. A method according to claim 8 further comprising: determining the area of pieces cut by the dies on the hide; and, comparing the area of the hide with the area cut by the dies.

10. A method according to claim 8 further comprising comparing a yield of the hide to a desired yield of the hide.

11. A system comprising:
an RFID (Radio Frequency Identification) tag reader;
a plurality of cutting dies;
a plurality of RFID tags connectable to the corresponding cutting dies; and
a controller including a computer usable program code including program instructions for:
scanning instruction the RFID tag reader to scan the RFID tags;
updating respective piece counts corresponding to specific shapes provided by some of the plurality of cutting dies; and
displaying the respective piece counts.

12. A system according to claim 11 further comprising Radio Frequency (RF) shielding defining an area within which the RFID tags can be scanned.

13. A system according to claim 11 further comprising a display for displaying respective piece counts or other information.

14. A system according to claim 11 further comprising a spacer between each die and its respective RFID tag.

* * * * *